United States Patent
Inagaki et al.

(10) Patent No.: US 6,712,172 B2
(45) Date of Patent: Mar. 30, 2004

(54) VEHICLE FOR TRAVELING ON UNEVEN GROUND

(75) Inventors: Takashi Inagaki, Saitama (JP); Toshio Shimada, Saitama (JP); Yoshiaki Hori, Saitama (JP); Takashi Shichinohe, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/801,641

(22) Filed: Mar. 9, 2001

(65) Prior Publication Data

US 2001/0023788 A1 Sep. 27, 2001

(30) Foreign Application Priority Data

Mar. 9, 2000 (JP) ........................................ 2000-065371

(51) Int. Cl.[7] .................................................. B60K 1/00
(52) U.S. Cl. ........................ 180/292; 180/337; 180/908
(58) Field of Search ................................. 180/292, 375, 180/376, 210, 233, 908

(56) References Cited

U.S. PATENT DOCUMENTS

| | | | | | |
|---|---|---|---|---|---|
| 3,580,350 A | * | 5/1971 | Arkus-Duntov | ............ | 180/248 |
| 4,449,604 A | * | 5/1984 | Suzuki | ............... | 180/233 |
| 5,267,488 A | * | 12/1993 | Hardeman et al. | ........ | 74/606 R |
| 5,305,848 A | * | 4/1994 | Akutagawa et al. | ........ | 180/292 |
| 5,339,918 A | * | 8/1994 | Nakayama et al. | ......... | 180/292 |
| 5,636,608 A | | 6/1997 | Shichinohe et al. | ..... | 123/197.1 |
| 5,951,434 A | * | 9/1999 | Richards et al. | ............ | 475/284 |
| 5,957,799 A | * | 9/1999 | Kashiwase | ................... | 475/47 |
| 6,099,428 A | * | 8/2000 | Kashiwase | ................... | 475/68 |
| 6,155,371 A | * | 12/2000 | Izumi | ......................... | 180/292 |
| 6,170,597 B1 | * | 1/2001 | Fukuda | ....................... | 180/292 |
| 6,227,995 B1 | * | 5/2001 | Yamada | ..................... | 475/210 |
| 6,250,415 B1 | * | 6/2001 | Seto | ........................... | 180/337 |
| 6,386,067 B1 | * | 5/2002 | Inoue et al. | ............... | 74/730.1 |
| 2001/0020402 A1 | | 9/2001 | Shichinohe et al. | ....... | 74/730.1 |

FOREIGN PATENT DOCUMENTS

| | | |
|---|---|---|
| EP | 1 001 187 A2 | 5/2000 |
| JP | 58 146756 | 9/1983 |
| JP | 2000 205372 | 7/2000 |

* cited by examiner

*Primary Examiner*—Lesley D. Morris
*Assistant Examiner*—L. Lum
(74) *Attorney, Agent, or Firm*—Birch, Stewart, Kolasch & Birch, LLP (57) ABSTRACT

In a power transmission path of a vehicle for traveling on uneven ground, a torque converter is provided so that torque transmission to a propeller shaft varies smoothly. Accordingly, it is difficult for the torque transmitted to the propeller shaft to exceed a tire slip limit. This arrangement suppresses slippage during traveling on uneven ground such as a muddy, marshy, sandy, snowy, or gravel road surfaces.

21 Claims, 8 Drawing Sheets

VEHICLE FOR TRAVELING ON UNEVEN GROUND

BACKGROUND OF THE INVENTION

1. Field of the Invention

The present invention relates to a vehicle for traveling on uneven terrain, and more particularly to a saddle-type four- or three-wheel vehicle or the like.

2. Background Art

Ground contact pressure (load per tire/ground contact area) (kg/cm2) is an important factor in traveling on a road surface having a small friction coefficient ($\mu$), such as a muddy, marshy, sandy, snowy, or graveled road surface.

The ground contact pressure of a general passenger car is normally within the range of 1.8–2.3 kg/cm2. Therefore, traveling on a soft road having a small friction coefficient ($\mu$) in such a passenger car results in significant tire sinking as well as road surface grip deterioration, especially in a road surface having small protrusions such as a gravel road surface which degrades traveling performance.

Therefore, a vehicle fitted with low-pressure balloon tires, having small ground contact pressure, has been suggested for traveling on uneven ground as described above. The ground contact pressure of the aforementioned low-pressure balloon tire is approx. ⅕th that of the passenger car, i.e. no more than 0.50 kg/cm2.

Figure 1:
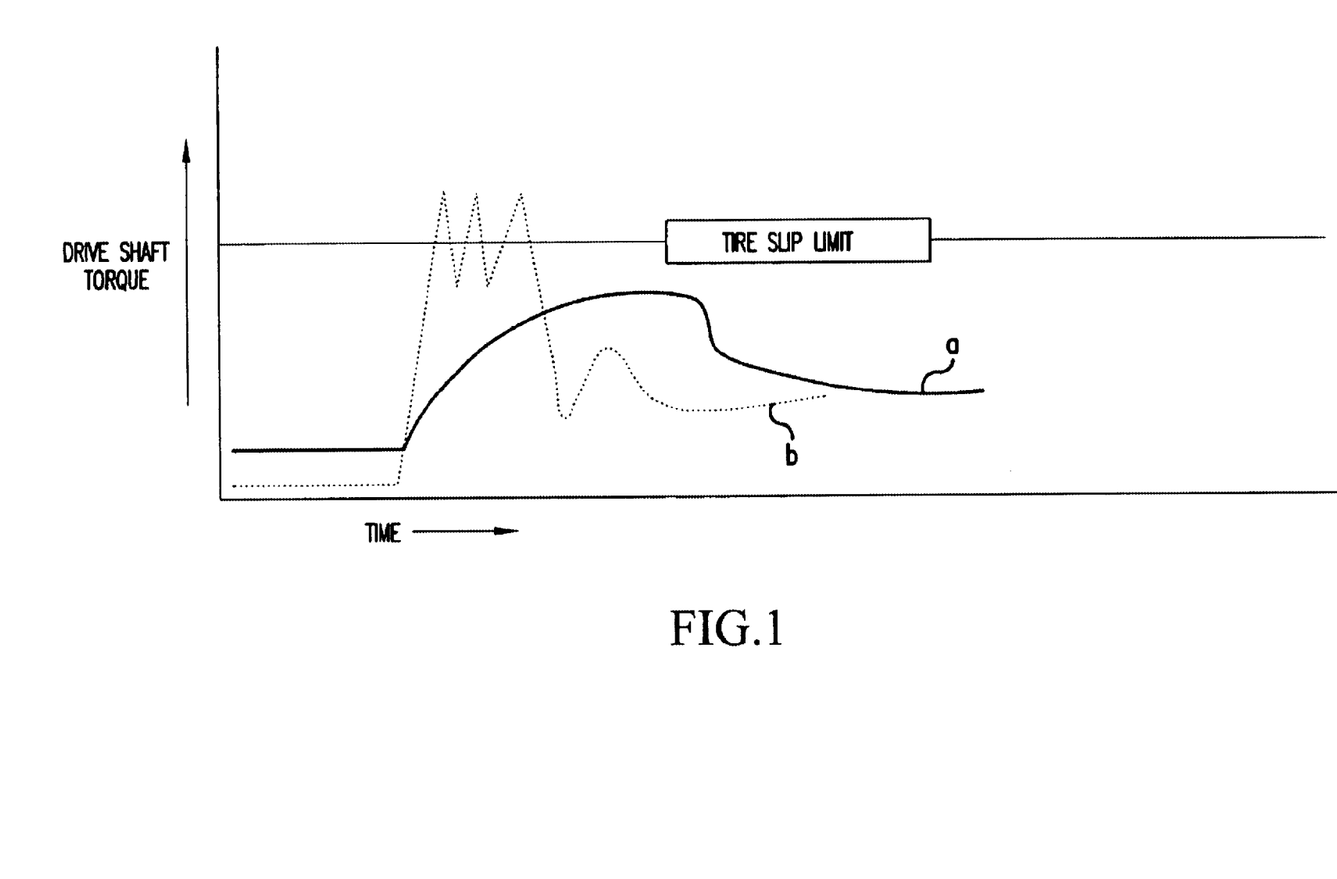
FIG. 1 is a graphical view showing a relationship between torque transmission time and torque transmitted to a drive shaft of a conventional vehicle traveling on uneven ground and a vehicle according to an embodiment of the present invention.

FIG. 1 is a graphical view showing the relationship between torque transmission time (abscissa axis) and torque transmitted to a drive shaft (ordinate axis) of a vehicle traveling on uneven ground fitted with the low-pressure balloon tires. In FIG. 1, a dotted line (b) shows the relationship for a conventional vehicle traveling on uneven ground and equipped with a manual transmission (MT).

As seen in FIG. 1, when the manual transmission (MT) is switched from a neutral to a low position, a significant torque variation is experienced that often exceeds a slip limit of the tire. This occurs even though the vehicle is fitted with low-pressure balloon tires having small ground contact pressure.

SUMMARY OF THE INVENTION

The present invention overcomes the shortcomings associated with the related art and achieves other advantages not realized by the related art.

An aspect of the present invention is to provide a vehicle for operating on uneven terrain having reduced power transmission creep, improved slip functionality, and smooth power transmission.

An additional aspect of the present invention is to provide smooth power transmission and creep reduction can be accomplished in a idle speed or neutral gear train setting.

These and other aspects of the invention are accomplished by a vehicle for traveling on uneven terrain comprising low-pressure balloon tires, and a power unit having an engine and a multistage transmission, wherein a torque converter is provided in a power transmission path extending from an engine crankshaft to a multistage transmission input shaft.

These and other aspects of the present invention are further accomplished by a vehicle for traveling on uneven terrain comprising a plurality of low-pressure balloon tires; a vehicle body having a longitudinal direction and a transverse direction; and a power unit having an engine and a multistage transmission, wherein a torque converter is provided in a power transmission path extending from an engine crankshaft to a multistage transmission input shaft, the engine crankshaft arranged in parallel with the longitudinal direction of the vehicle body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not intended to limit the present invention to the embodiments shown, and wherein.

DETAILED DESCRIPTION OF THE PREFERRED EMBODIMENTS

Hereinafter, the present invention will be described in detail with reference to the accompanying drawings.

The vehicle shown in the accompanying figures is a saddle-type four-wheel buggy for traveling on uneven ground. However, it will be appreciated by one of ordinary skill in the art that the present invention is equally applicable to other off-road vehicles having greater or fewer than four-wheels.

Figure 2:
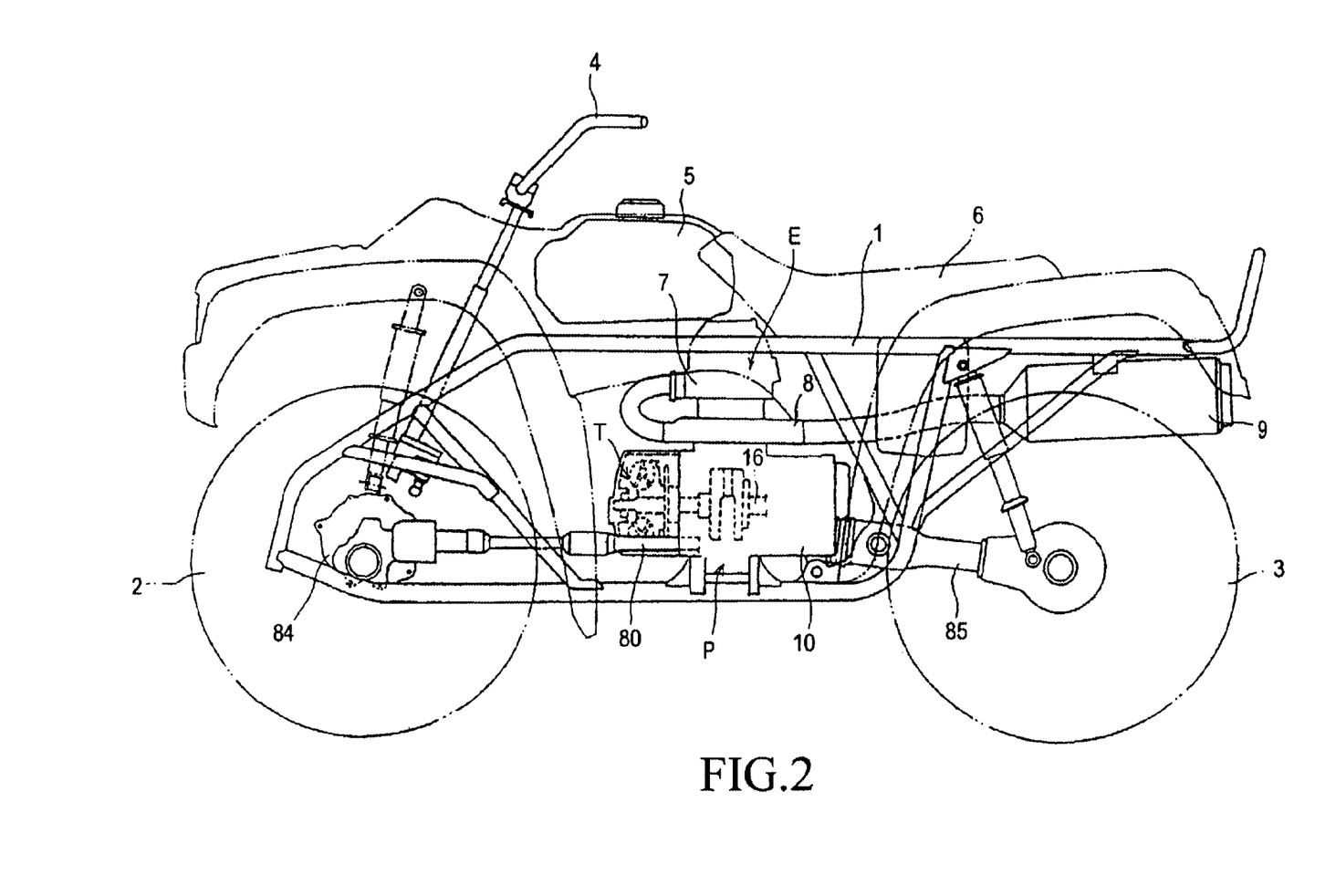
FIG. 2 is a side view of a vehicle for traveling on uneven ground according to an embodiment of the present invention.
Figure 3:
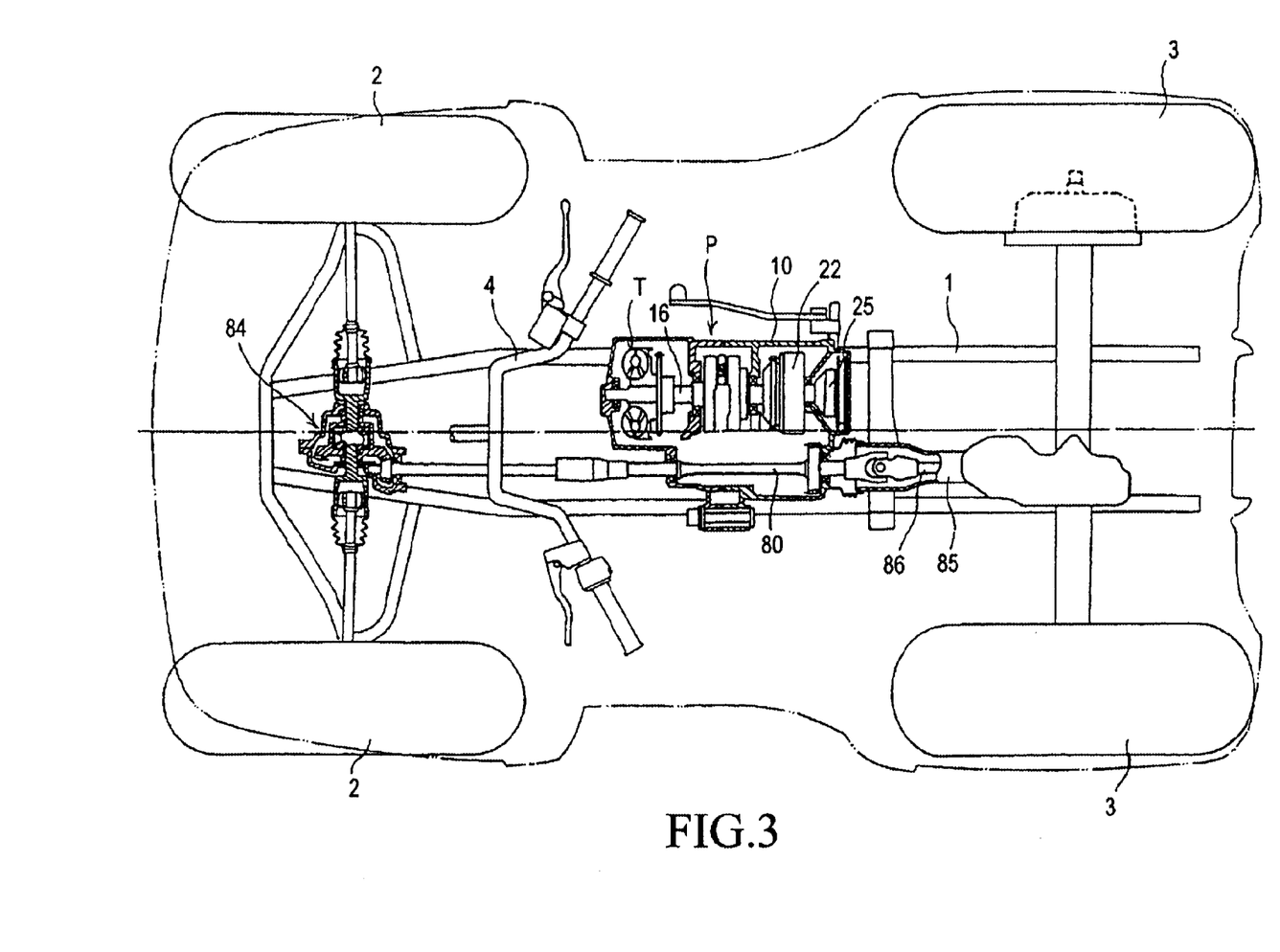
FIG. 3 is an top plan view of the vehicle of FIG. 2 according to an embodiment of the present invention.

As seen in FIG. 2 and FIG. 3, a saddle-type four-wheel buggy has a pair of left and right front wheels 2 for driving and steering suspended in a front portion of a body frame 1 and made of a welded pipe. A pair of left and right rear driving wheels 3 is suspended in a rear portion thereof. The ground contact pressure of the front and rear wheels 2, 3 is no more than 0.50 kg/cm2, and in this embodiment low-pressure balloon tires having ground contact pressure of no more than 0.25 kg/cm2 are used.

A handle 4 for steering the front wheels 2 is provided on a front end of the body frame 1. A fuel tank 5 is disposed in an intermediate portion between the front and the rear thereof. A straddle type seat 6 is disposed in an upper portion of the body frame 1 at the rear relative to the fuel tank 5. A power unit P including an engine E, a torque converter T and a transmission mechanism M is fitted below the fuel tank 5 and the seat 6.

One end of an exhaust pipe 8 is connected to a front exhaust port of a cylinder head 13 in an upper portion of a cylinder block 7 in the engine E, while the other end of the exhaust pipe 8 is connected through a side of the power unit P to a muffler 9 provided at the rear of the body.

Figure 4:
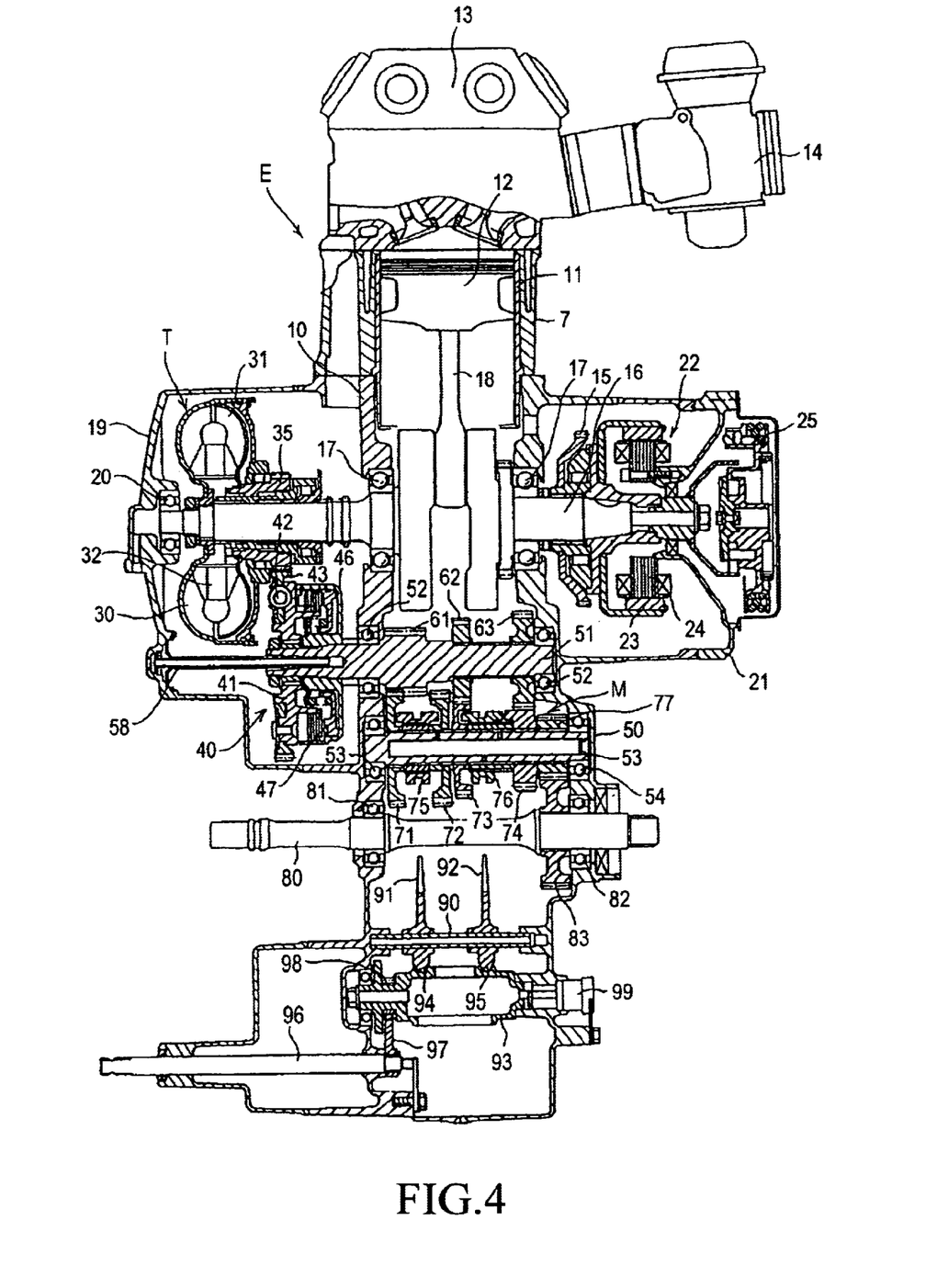
FIG. 4 is a cross-sectional view of a power unit mounted in a vehicle according to an embodiment of the present invention.

Next, a structure of the power unit P will be described. As best seen in FIG. 4, a cylinder block 7 is vertically provided in a crankcase 10 of the engine E and a piston 12 is slidably fitted inside the cylinder block 7 via a sleeve 11. An air cleaner (not shown) and a carburetor 14 are connected to a cylinder head 13 in an upper portion of the cylinder block 7.

A crankshaft 16 is rotatably mounted in the crankcase 10 via ball bearings 17, 17, and is coupled to the piston 12 by a connecting rod 18. The crankshaft 16 is disposed in the longitudinal direction of the vehicle body so that a portion of the crankshaft 16 protruding forwardly (to the left in FIG. 4) from the crankcase 10 is enclosed in an engine front cover 19 while a fore-end portion of the crankshaft 16 is rotatably mounted via a ball bearing 20. A portion protruding rearwardly (to the right in FIG. 4) from the crankcase 10 is enclosed in an engine rear cover 21.

A rotor 23 of an electric generator 22 is fitted to the crankshaft 16 facing into the engine rear cover 21. A stator 24 disposed at an inner side of the rotor 23 is secured to the engine rear cover 21.

Also, a recoil starter 25 with a knob protruding in a rear portion of the power unit P is fitted to the rear end of the crankshaft 16 to sandwich the electric generator 22 therebetween. A start gear 15 that engages a starting motor is disposed between the electric generator 22 and the crankcase 10.

Figure 5:
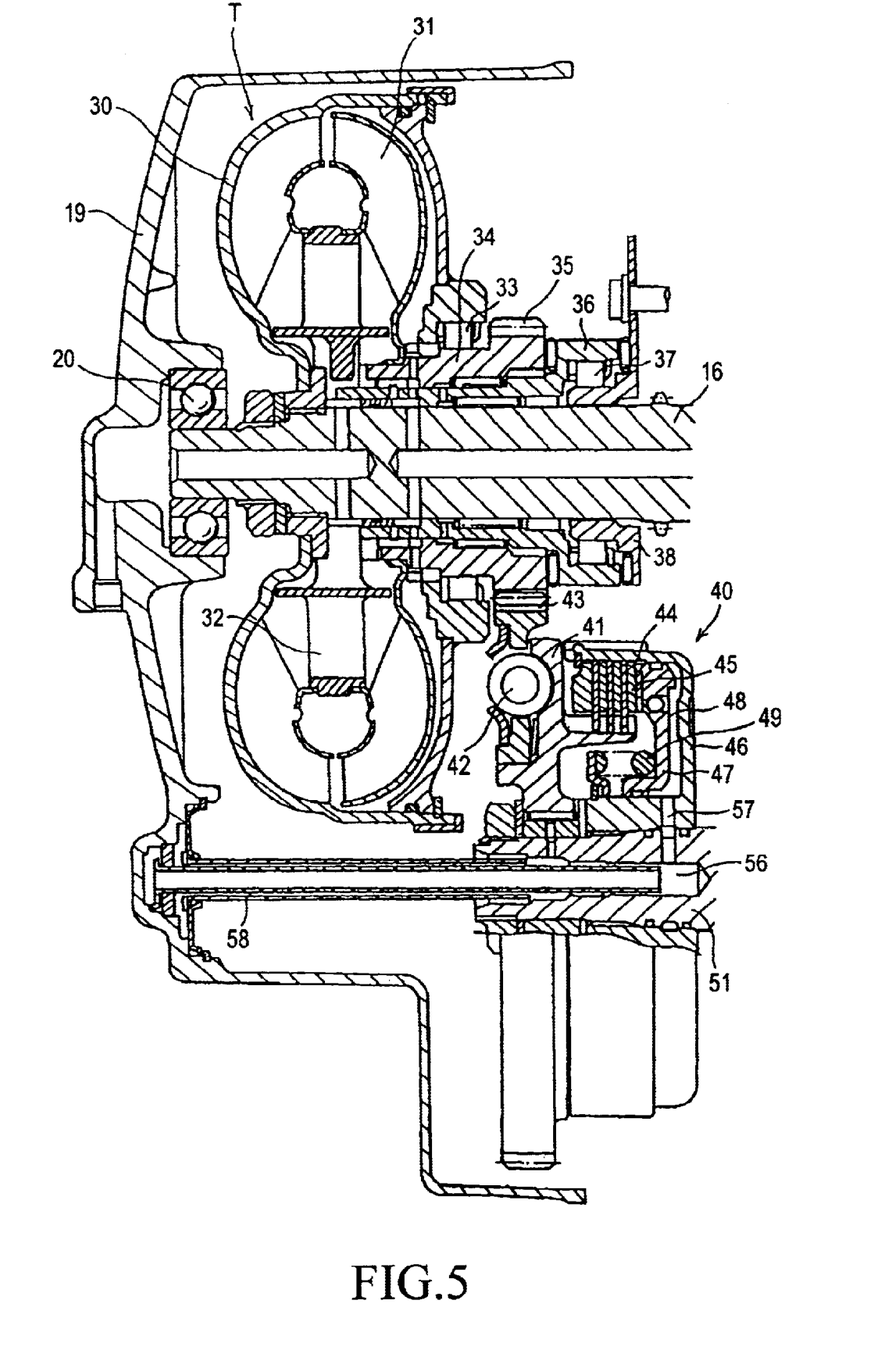
FIG. 5 is an enlarged view of portions of a torque converter according to an embodiment of the present invention.

The torque converter T is also disposed in the front cover 19. The torque converter T includes a pump impeller 30, a turbine runner 31 and a stator impeller 32. The torque converter T is filled with oil so as to transmit power.

This embodiment also has a temperature reducing effect on the torque converter T due to traveling wind sweeping across the engine E. Since the crankshaft 16 is disposed in the same longitudinal direction as that of the vehicle body, and the torque converter T is provided at the front end of the crankshaft 16, wind traveling across the front cover 19 produces a desirable cooling effect.

The pump impeller 30 rotates integrally with the crankshaft 16. The turbine runner 31 is disposed opposite the pump impeller 30 and is secured to a turbine shaft 34 arranged rotatably and coaxially relative to the crankshaft 16. The turbine shaft 34 is coupled to the pump impeller 30 by a one-way clutch 33.

The rotation of the pump impeller 30 is transmitted through the filling oil in the torque converter T to the turbine runner 31, while power is transmitted through a primary gear 35 and a clutch 40 to the transmission mechanism M.

A stator shaft 36 of the stator impeller 32 is rotatable about a support member 38 fixed to the crankcase 10 by means of a one-way clutch 37. A significant rotation difference between the pump impeller 30 and the turbine runner 31 causes no rotation of the stator impeller 32. Accordingly, a smooth flow of the oil from the turbine runner 31 permits torque amplification of torque reaction to the stator impeller 32.

On the other hand, a small rotation difference between the pump impeller 30 and the turbine runner 31 allows the stator impeller 32 to idle so as to cause little resistance.

Figure 6:
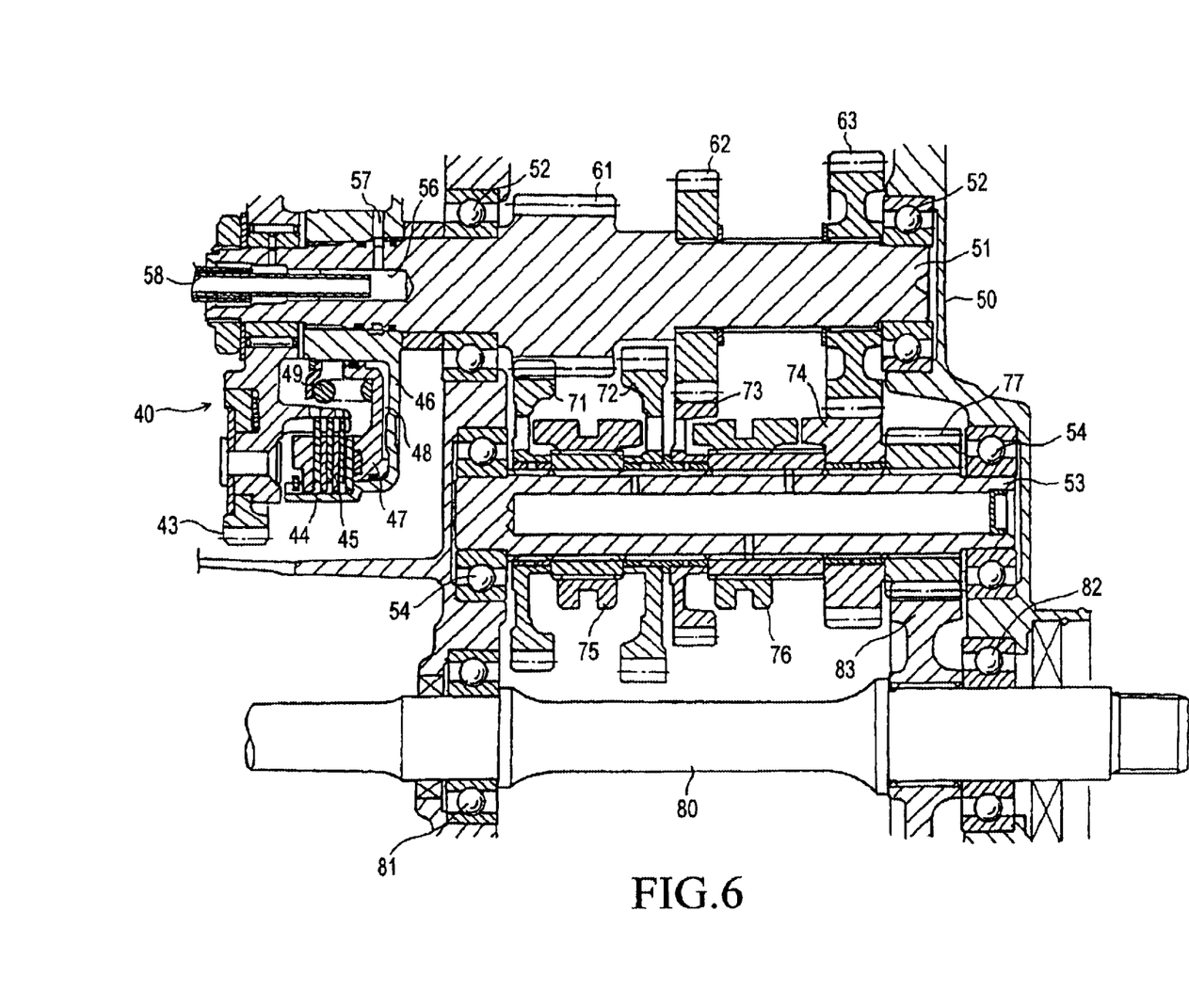
FIG. 6 is an enlarged view of a multistage transmission mechanism of FIG. 3 according to an embodiment of the present invention.

The transmission mechanism M is held in a transmission case 50 formed integrally with the crankcase 10. An input shaft 51 parallel to the crankshaft 16 is rotatably mounted to the transmission case 50 via a ball bearing 52. An output shaft 53 parallel to the crankshaft 16 is rotatably mounted to the transmission case 50 via a ball bearing 54.

Also, a clutch 40 is provided at one end of the input shaft 51 (at the front of the body). Effective use of space is ensured by arranging the clutch 40 between the torque converter T and the crankcase 10 so that part of it overlaps the torque converter T when viewed in the longitudinal direction of the body.

The clutch 40 includes a clutch center 41 rotatable on the input shaft 51, a driven gear 43 coupled to the clutch center 41 by a dampener spring 42 while being meshed with a driving gear 35 of the torque converter T, and a plurality of first clutch plates 44 relatively non-rotatably engaging the outer periphery of the clutch center 41.

The clutch also includes a plurality of second clutch plates 45 superimposed and arranged between the first clutch plates 44, a clutch outer 46 containing the first and second clutch plates 44, 45 and rotating integrally with the input shaft 51 by relatively non-rotatably engaging the outer periphery of the second clutch plates 45, and a hydraulic piston 47 slidably fitted in the clutch outer 46.

An oil chamber 48 is formed between the hydraulic piston 47 and an interior of the clutch outer 46, while a spring 49 is arranged on the opposite side of the oil chamber 48 to energize the hydraulic piston 47 in such a direction as to reduce the size of the oil chamber 48.

The input shaft 51 is axially formed with an oil path 56 communicating with the oil chamber 48 through an oil path 57. The oil path 56 is supplied with oil through a pipe 58 extending toward the engine front cover 19.

After the oil is fed through the pipe 58 and the oil paths 56, 57 into the oil chamber 48, the hydraulic piston 47 moves against the spring 49. This movement of the spring 49 presses the first and second clutch plates 44, 45 against each other, and turns on the clutch 40, thereby transmitting the power from the torque converter T to the input shaft 51.

Conversely, by removing the oil from the oil chamber 48, the piston 47 moves in an opposite direction, thereby separating the first and second clutch plates 44, 45 from each other, and effectively turning off the clutch 40.

In a preferred embodiment, the clutch 40 is turned on or off on the basis of a signal from an idling sensor and a transmission operation sensor. That is, during engine idling and transmission operation, the clutch 40 is turned off so as not to transmit power from the torque converter T to the input shaft 51.

Accordingly, no creep phenomenon can occur during idling, and the resistance can be reduced during transmission operation.

The input shaft 51 is provided with driving gears 61, 62, 63 integral therewith or separate therefrom, but which can rotate integrally the input shaft. Also, the output shaft 53 is rotatably provided with driven gears 71, 72, 73, 74.

The driving gear 61 is meshed with the driven gear 71, so that they constitute a first speed gear train. The driving gear 62 is meshed with the driven gear 73, so that they constitute a second speed gear train, and the driving gear 63 is meshed with the driven gear 74 for effectively forming a third speed gear train.

Further, a reverse gear train is formed by the driving gear 61 meshed with the driven gear 72, and by means of an intermediate gear provided for an intermediate shaft, not shown, existing between the input and output shafts 51, 53.

Further, by means of splines, the output shaft 53 is engaged with dog clutches 75, 76 rotatable integrally therewith and axially movable. The dog clutches 75, 76 are selectively engaged with any one of the driven gears 71, 73, 74, or 72, so that the first, the second, the third speed gear train, or the reverse gear train, is established. The dog clutches are selectively engaged by means of shift forks 91, 92 that will be described later.

Also, a neutral position is defined by a state where the dog clutches 75, 76 are not engaged with any one of the driven gears 71, 73, 74, or 72.

A driving shaft 80 parallel to the output shaft 53 is rotatably mounted to the transmission case 50 by ball bearings 81, 82. A driving gear 77 provided for the output shaft 53 is meshed with a driven gear 83 provided for the driving shaft 80. The driving shaft 80 is rotated at a gear ratio of the established gear train and in a rotation direction thereof, thereby transmitting the rotation driving force through propeller shafts to front and rear wheels 2, 3.

Also, the driving force of the driving shaft 80 is transmitted to the front wheels 2 through the propeller shaft and a differential gear 84. The driving force is transmitted to the rear wheels 3 through the propeller shaft 86 held in a swing arm 85. Also, the driving shaft 80 is coupled to the propeller shaft by means of a constant velocity joint.

A shaft 90 is provided parallel to an output shaft 53 in the transmission case 50, and is slidably provided with shift forks 91, 92.

In the drawings, the dog clutches 75, 76 are separated from the shift forks 91, 92 in order to avoid intersecting of lines, but in reality the dog clutches 75 and 76 are engaged with the shift forks 91 and 92, respectively.

The base ends of the shift forks 91, 92 are engaged with cam grooves 94, 95 of a shift drum 93 disposed parallel to the shaft 90. Engagement is accomplished by transmitting the rotation of a shift spindle 96 through a fan-shaped gear 97 and a driven gear 98 to the shift drum 93.

The shift spindle 96 is rotated by transmitting the rotation of an electric motor, not shown, through a speed reducing gear train. Also, a detector 99 for detecting a shift position is attached to the rear end of the shift drum 93 so as to determine the shift position from the rotation speed thereof.

Figure 7:
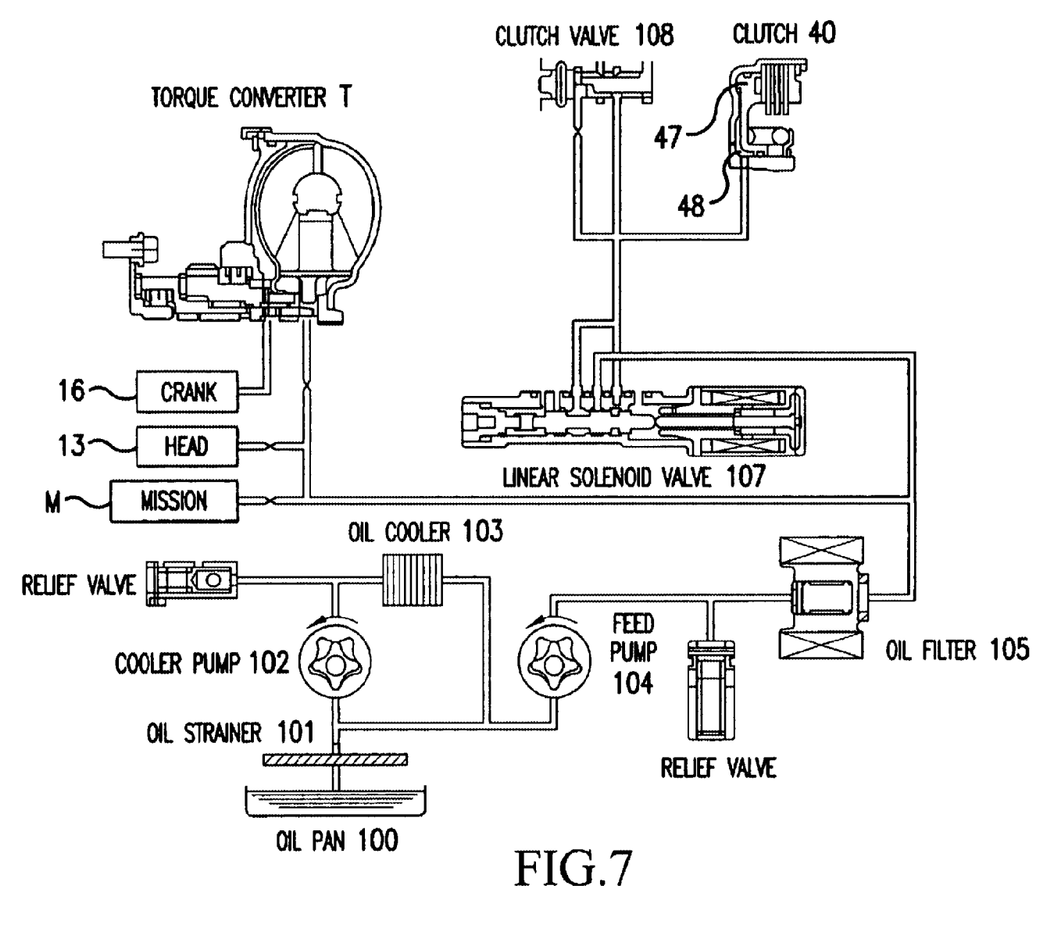
FIG. 7 is an oil pressure control circuit diagram for the power unit shown in FIG. 4.

FIG. 7 is an oil pressure control circuit diagram for the power unit P shown in FIGS. 4, 5, 6. In this embodiment, the oil is used as hydraulic oil for the torque converter T and the clutch 40, as well as lubricating oil for being fed to the crankshaft 16, the cylinder head 13, and the transmission mechanism M.

The oil is sucked from an oil pan 100 through an oil strainer 101 by a cooler pump 102 and is cooled by an oil cooler 103. The oil is then returned into the oil pan 100.

The oil in the oil pan 100 is sucked through the oil strainer 101 by a feed pump 104, and is fed therefrom through an oil filter 105 to a linear solenoid valve 107.

By operating the linear solenoid valve 107, the oil is fed into the oil chamber 48 of the clutch 40, and moves the hydraulic piston 47 to the right in FIG. 7. The hydraulic piston 47 presses the first and second clutch plates 44, 45 against each other, thereby turning on the clutch 40.

As described above, the driving force is transmitted from the torque converter T to the transmission mechanism M by turning on the clutch 40.

The turning off of the linear solenoid valve 107 reduces the oil pressure for feeding to the clutch 40, and therefore brings the clutch 40 into an off state. A clutch valve 108 is then operated so as to rapidly deliver the feed oil to the clutch 40 and thereby improve the operational response thereof.

Also, a portion of the oil through the oil filter 105 is fed as lubricating oil to the cylinder head 13 and the transmission mechanism M, while the remaining oil is fed as hydraulic oil to the torque converter T. Oil from the torque converter T is further fed to the crankshaft 16 as lubricating oil.

Also, the oil used as lubricating or hydraulic oil is recycled into the oil pan 100 through a return circuit (not shown).

Figure 8:
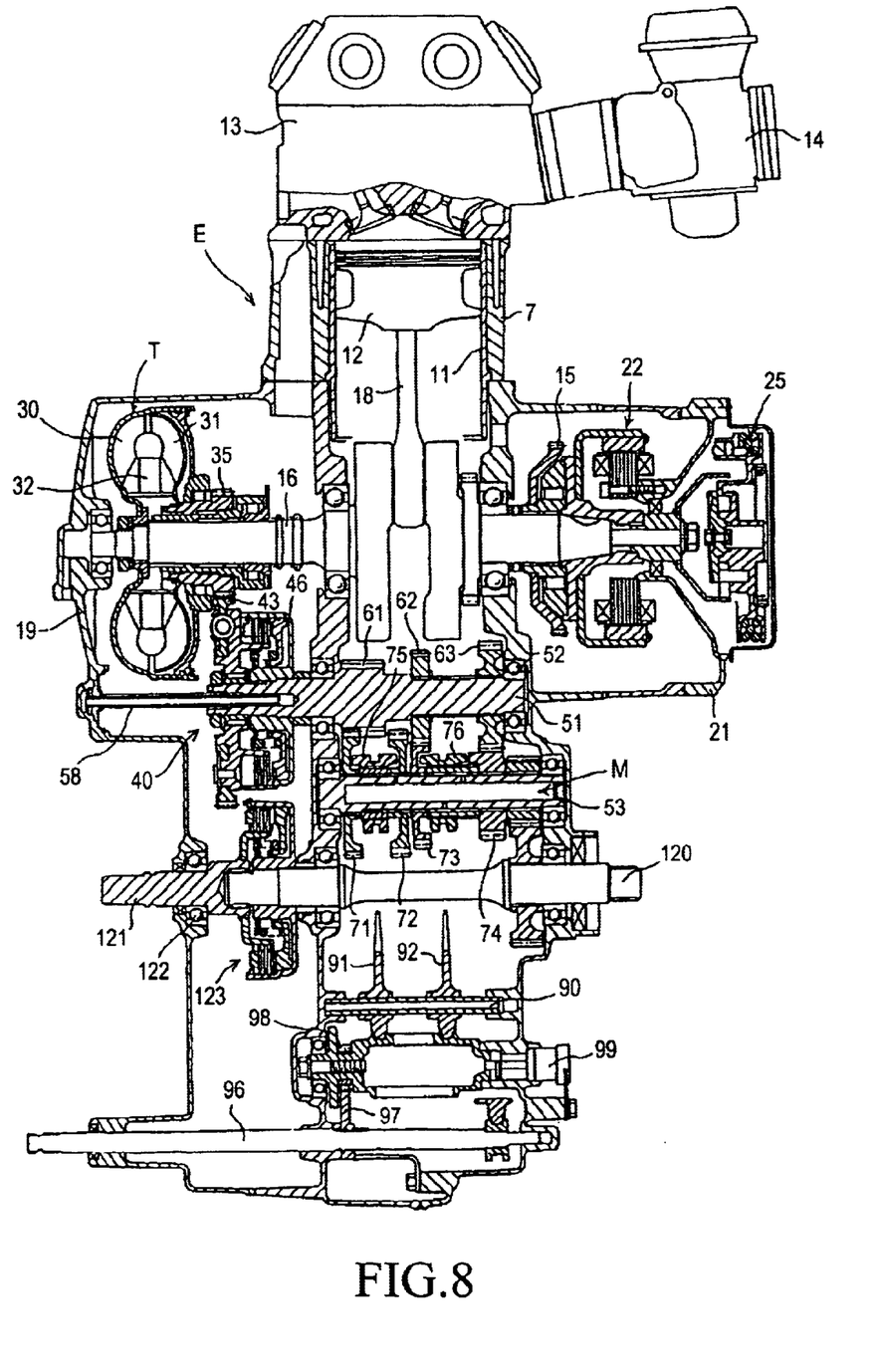
FIG. 8 is a cross-sectional view of a power unit mounted in a vehicle according to an embodiment of the present invention.

FIG. 8 is a similar cross-sectional view to FIG. 4, illustrating another embodiment of the power unit P. In this embodiment, a clutch 123 performing on/off operation in a power transmission is interposed between a driving shaft 120 and a propeller shaft 121 for front wheels. The propeller shaft 121 is rotatably mounted via a ball bearing 122 on the front cover 19 extending to the front of the transmission case 50, instead of coupling the propeller 121 and driving 120 shafts together by means of the constant velocity joint as in the aforementioned embodiment.

Thus, in the on state of the clutch 123, the power is transmitted through the driving shaft 120 to the propeller shaft 121 for the front wheels so that both the front and rear wheels are converted into driving wheels. While in the "off" state of the clutch 123, the power transmission to the propeller shaft 121 for front wheels is interrupted so that the front wheels function only as steering wheels.

While a saddle riding type vehicle for traveling on uneven ground has been illustrated in the accompanying drawings, application of the invention is not limited to a saddle riding type vehicle. Also, while the rear wheels are upwardly and downwardly swingable by the swing arm in the accompanying drawings, the invention may be a four-wheel independent suspension type.

Moreover, while the crankshaft is arranged in the longitudinal direction of the body in the accompanying drawings, it may be arranged in the transverse direction of the body.

During traveling on uneven ground, such as a muddy, marshy, sandy, snowy, or graveled road, slippage can be controlled by the torque converter provided in the power transmission path extending from the crankshaft to the input shaft of the multistage transmission, so that the traveling performance is improved while the possibility of breaking up a road surface or of damaging crops, etc. is reduced.

That is, in a conventional vehicle for traveling on uneven ground, the transmission torque depends on only a pressing force, and varies so significantly on account of the manual transmission (MT) that the torque transmitted to the propeller shaft exceeds the tire slip limit during traveling on a low friction coefficient ($\mu$) road, as shown by the dotted line (b) in FIG. 1.

However, by providing the torque converter in the power transmission path, the torque (T) transmitted to the propeller shaft, expressed as $T = t \cdot (N/1000)^2$, varies smoothly with the varying torque capacity (t) and rotation speed (N).

Accordingly, it is difficult for the torque transmitted to the propeller shaft to exceed the tire slip limit as shown by the solid line (a) in FIG. 1 with the present invention.

This invention is effective in a small ground contact pressure tire, that is, a tire that is less prone to sinking on a soft road and capable of tracking small irregularities of, for example, sand or gravel, particularly a low-pressure balloon tire having no more than 0.50 kg/cm2 concrete ground contact pressure.

In the power transmission path, the clutch is provided to be in series with and besides the torque converter so that the power being slightly transmitted from the engine to the propeller shaft, the so-called creep phenomenon, can be avoided in the neutral position.

Moreover, while in the prior art the switching resistance of the transmission is large because friction caused by the transmission torque acts continuously on a switching portion of the transmission, the clutch is provided to bring the transmission into a no-load state irrespective of the presence of the torque converter. Therefore, power transmission can be lightly performed without accompanying torque shock.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle for traveling on uneven terrain comprising:
   low-pressure balloon tires; and
   a power unit having an engine with a crankcase and a multistage transmission, wherein a torque converter is provided in a power transmission path extending from an engine crankshaft to a multistage transmission input shaft, said engine having a crankshaft disposed in a longitudinal direction of the vehicle in parallel to said multistage transmission input shaft, said torque converter is disposed in front of said engine on said crankshaft, and a clutch is provided on a first end of said multistage transmission input shaft and is arranged between said torque converter and said crankcase,
   wherein said torque converter and said clutch overlap each other when viewed from a front of said power unit.

2. The vehicle according to claim 1, wherein said clutch is provided in the power transmission path in series with the torque converter.

3. The vehicle according to claim 1, wherein a ground contact pressure of each low-pressure balloon tire is no greater than 0.50 kg/cm2.

4. The vehicle according to claim 2, wherein a ground contact pressure of each low-pressure balloon tire is no greater than 0.50 kg/cm2.

5. The vehicle according to claim 1, wherein said transmission includes an output shaft mounted in parallel to said crankshaft, said multistage transmission input shaft and said output shaft being located beneath said crankshaft.

6. A vehicle for traveling on uneven terrain comprising:
   a plurality of low-pressure balloon tires;
   a vehicle body having a longitudinal direction and a transverse direction; and
   a power unit having an engine with a crankcase and a multistage transmission, wherein a torque converter is provided in a power transmission path extending from an engine crankshaft to a multistage transmission input shaft, said engine crankshaft is arranged in parallel with the longitudinal direction of said vehicle body and said multistage transmission input shaft, said torque converter is disposed in front of said engine on said crankshaft, and a clutch is provided on a first end of said multistage transmission input shaft and is arranged between said torque converter and said crankcase,
   wherein said torque converter and said clutch overlap each other when viewed from a front of said power unit.

7. The vehicle according to claim 6, wherein said engine includes a crankcase, an engine front cover and an engine rear cover, said crankshaft having a first end rotatably supported within said engine front cover, an intermediate portion within said crankcase, and a second end rotatably supported within said engine rear cover.

8. The vehicle according to claim 7, wherein said torque converter is disposed within said front cover.

9. The vehicle according to claim 8, wherein said torque converter includes a pump impeller, a turbine runner, a stator impeller and oil.

10. The vehicle according to claim 9, wherein said pump impeller rotates integrally with said crankshaft and said turbine runner is secured to a turbine shaft arranged coaxially and rotatably relative to said crankshaft.

11. The vehicle according to claim 10, wherein said turbine shaft is coupled to the pump impeller by a one-way clutch.

12. The vehicle according to claim 7, wherein said multistage transmission is formed integrally with said crankcase in a transmission case.

13. The vehicle according to claim 12, wherein said multistage transmission input shaft is rotatably mounted within said transmission case.

14. The vehicle according to claim 13, wherein said multistage transmission is further provided with an output shaft, said input shaft having a plurality of driving gears meshing with a plurality of driven gears of said output shaft.

15. The vehicle according to claim 14, wherein said clutch further comprises an oil chamber formed between a hydraulic piston pressingly engaged with a plurality of clutch plates and an interior of a clutch housing.

16. The vehicle according to claim 15, wherein a spring is arranged on a first side of said hydraulic piston and said oil chamber is formed on a second side of said hydraulic piston.

17. The vehicle according to claim 6, wherein a ground contact pressure of each low-pressure balloon tire is no greater than 0.50 kg/cm2.

18. The vehicle according to claim 16, wherein a ground contact pressure of each low-pressure balloon tire is no greater than 0.50 kg/cm2.

19. The vehicle according to claim 6, wherein said multistage transmission input shaft is located beneath said crankshaft.

20. A vehicle for traveling on uneven terrain comprising:
   a plurality of low-pressure balloon tires;
   a vehicle body having a longitudinal direction and a transverse direction; and
   a power unit having an engine with a crankcase and a multistage transmission, wherein a torque converter is provided in a power transmission path extending from an engine crankshaft to a multistage transmission input shaft, said engine crankshaft is arranged in parallel with the longitudinal direction of said vehicle body, said torque converter is disposed in front of said engine, and a clutch is provided at a first end of said multistage transmission input shaft and arranged between said torque converter and said crankcase.

21. The vehicle according to claim 20, wherein said multistage transmission is further provided with an output shaft, said input shaft having a plurality of driving gears meshing with a plurality of driven gears of said output shaft.

* * * * *